US009645239B2

(12) United States Patent
Lüthi et al.

(10) Patent No.: US 9,645,239 B2
(45) Date of Patent: May 9, 2017

(54) LASER TRACKER COMPRISING INTERFEROMETER AND ABSOLUTE DISTANCE MEASURING UNIT, AND CALIBRATION METHOD FOR A LASER TRACKER

(71) Applicant: LEICA GEOSYSTEMS AG, Heerbrugg (CH)

(72) Inventors: Thomas Lüthi, Aarau (CH); Burkhard Böckem, Rieden (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 274 days.

(21) Appl. No.: 14/399,497

(22) PCT Filed: May 6, 2013

(86) PCT No.: PCT/EP2013/059376
§ 371 (c)(1),
(2) Date: Nov. 6, 2014

(87) PCT Pub. No.: WO2013/167526
PCT Pub. Date: Nov. 14, 2013

(65) Prior Publication Data
US 2015/0138528 A1    May 21, 2015

(30) Foreign Application Priority Data

May 7, 2012  (EP) ..................... 12167003

(51) Int. Cl.
| | |
|---|---|
| *G01C 3/08* | (2006.01) |
| *G01S 17/87* | (2006.01) |
| *G01S 17/10* | (2006.01) |
| *G01S 17/36* | (2006.01) |
| *G01S 17/66* | (2006.01) |

(Continued)

(52) U.S. Cl.
CPC ............... *G01S 17/87* (2013.01); *G01B 9/02* (2013.01); *G01S 7/497* (2013.01); *G01S 17/10* (2013.01); *G01S 17/36* (2013.01); *G01S 17/66* (2013.01)

(58) Field of Classification Search
CPC .......... G01S 17/10; G01S 17/36; G01S 7/497; G01B 9/02

(Continued)

(56) References Cited

U.S. PATENT DOCUMENTS

| | | |
|---|---|---|
| 5,521,704 A | 5/1996 | Theil et al. |
| 5,764,360 A | 6/1998 | Meier |

(Continued)

FOREIGN PATENT DOCUMENTS

| | | |
|---|---|---|
| DE | 195 42 490 C1 | 6/1997 |
| EP | 0 623 801 A2 | 11/1994 |

(Continued)

OTHER PUBLICATIONS

European Search Report dated Jul. 12, 2012 as received in Application No. EP 12 16 7003.

*Primary Examiner* — Mark Hellner
(74) *Attorney, Agent, or Firm* — Maschoff Brennan

(57) ABSTRACT

Some embodiments described herein include a laser tracker for continuously tracking a reflective target and for determining the distance with respect to the target. The laser tracker may include beam directing unit for emitting a measurement radiation and for receiving at least part of the measurement radiation reflected at the target. The laser tracker additionally comprises an interferometer for determining a change in distance with respect to the target. A control and evaluation unit is designed in such a way that an interferometer wavelength of the measurement radiation is determined by defined sample measurements being carried out with variation of the distance with respect to the target, (Continued)

wherein the sample measurements are effected for at least two different distances with respect to the target, the measurement radiation is constantly oriented towards the target and with the interferometer wavelength being kept stable.

20 Claims, 3 Drawing Sheets

(51) Int. Cl.
  *G01S 7/497* (2006.01)
  *G01B 9/02* (2006.01)
(58) Field of Classification Search
  USPC ........................................................ 356/4.01
  See application file for complete search history.

(56) References Cited

U.S. PATENT DOCUMENTS

| 6,816,263 | B2 | 11/2004 | Kaczynski et al. |
| 7,230,689 | B2 | 6/2007 | Lau |
| 7,609,387 | B2 | 10/2009 | Meier |
| 8,031,331 | B2* | 10/2011 | Meier ................. G01B 11/002 356/3.01 |
| 2015/0088448 | A1* | 3/2015 | Du .......................... G01S 17/36 702/97 |

FOREIGN PATENT DOCUMENTS

| EP | 0 553 266 B1 | 6/1997 |
| EP | 1 647 838 A1 | 4/2006 |
| EP | 2 589 982 A1 | 5/2013 |
| EP | 2 662 661 A1 | 11/2013 |
| JP | H03-009202 A | 1/1991 |
| JP | 03-269302 A | 11/1991 |
| JP | 05-312523 A | 11/1993 |
| JP | 2003-042714 A | 2/2003 |
| JP | 2006-510873 A | 3/2006 |
| JP | 2007-303850 A | 11/2007 |
| WO | 92/07233 A1 | 4/1992 |
| WO | 2007/079600 A1 | 9/2007 |
| WO | 2010/057169 A2 | 5/2010 |

* cited by examiner

LASER TRACKER COMPRISING INTERFEROMETER AND ABSOLUTE DISTANCE MEASURING UNIT, AND CALIBRATION METHOD FOR A LASER TRACKER

FIELD OF THE INVENTION

The invention relates to a laser tracker comprising an interferometer and a calibration method for and with a laser tracker.

BACKGROUND

For measurements in the field of optical metrology, wavelength-stabilized gas lasers (HeNe lasers) are frequently used as the light source. Said gas lasers essentially have a high wavelength stability (depending on the stabilization method) and a large coherence length of a few hundred meters. As a result, said beam sources are particularly suitable for use as frequency and wavelength standard and enable measurement ranges which are large for interferometric measurement systems. Typical uses include, for example, linear interferometers, wavelength standard, vibrometer, and the use as interferometer light source in a laser tracker.

However, one disadvantage of the use of gas laser sources (HeNe laser light sources) is, as concerns a generally desired miniaturization, in particular of laser trackers, the dimensioning thereof defining the light output. The output of the light source here significantly depends on the length of the laser tube, i.e. the longer the tube, the greater the obtainable emission performance. In addition, such a laser source usually exhibits a relatively large power dissipation. Another disadvantage is the high-voltage supply required for operation. For example, for the laser to ignite, a voltage of approximately 7000 V and, during operation, a voltage of approximately 1500 V must be provided, as a result of which, during use of such light sources, special components (for example high-voltage power supply and shield) must be used and safety measures must be taken. Even the sensitivity with respect to magnetic fields (for example produced by internal motors or external welding transformers) and the limited lifetime of the tubes (typically about 15,000 operating hours) make the use of HeNe lasers a disadvantage—for example because the light sources must frequently be replaced in the systems at great expense.

Alternative light sources are, in this context, for example laser diodes. They are generally compact, cost-effective and have a low power consumption. Conventional Fabry-Perot laser diodes, however, are not suitable as interferometer light sources since they have a relatively small coherence length and do not emit in single-mode fashion (longitudinally) (i.e. emit with a plurality of wavelengths).

Beam sources which can be used are, however, for example

- distributed feedback laser (DFB) (with a periodically structured active medium, for example a grating),
- distributed Bragg reflector laser (DBR) (with an optical grating outside the active medium but arranged on a common chip),
- fiber Bragg grating laser (FBG) (substantially in accordance with a DFB laser, but with a grating in an external fiber),
- external cavity diode laser (ECDL) (stabilization of the laser diode using an external highly stable cavity, for example with a holographic grating),
- diode pumped solid state lasers (DPSS),
- discrete mode lasers (DMD) and/or
- microchip lasers.

The beam sources are here configured such that the emitted laser beam is single-mode with respect to the wavelength with a coherence length in the order of magnitude of multiple 10 m (or a linewidth of <1 MHz).

For the use of such laser diodes as an interferometer light source or as a wavelength standard, additionally some stable-holding of a specific wavelength is required. As is known, this can be effected for example spectroscopically using an absorption line of an absorption medium (for example using a gas cell). The disadvantage of using an absorption cell for stabilizing is, in turn, the required space associated therewith.

Alternatively, any wavelength could in principle simply be set and, during production, be identified by means of an external wavelength measuring appliance. If the diode parameters set therefor, such as for example temperature and current, are stored and are restored when it is next switched on, the original wavelength should be obtained again. However, the implementation of this stabilization capability is difficult for example on account of ageing effects of the diodes and a wavelength change which is caused thereby and continues to have uncertainties with respect to the emitted wavelength.

The requirements for such a measurement appliance are transferable analogously to measurement apparatuses which have an interferometer unit for determining distance changes. Here, measurement apparatuses which are configured for continuous tracking of a target point and coordinative determination of the position of this point can be combined generally under the term laser tracker. A target point can in this case be represented by a retroreflective unit (for example cube prisms), at which an optical measurement beam of the measurement apparatus, in particular a laser beam, is aimed. The laser beam is reflected back to the measurement apparatus in a parallel manner, wherein the reflected beam is captured with a capturing unit of the apparatus. Here, an emission or reception direction of the beam is ascertained, for example using sensors for angular measurement which are assigned to a deflection mirror or a targeting unit of the system. In addition, by capturing the beam, a distance of the measurement appliance to the target point is ascertained, for example using time-of-flight or phase difference measurement.

Laser trackers according to the prior art can additionally be configured with an optical image capture unit having a two-dimensional light-sensitive array, for example a CCD or CID camera (CCD=charge coupled device; CID=charge injection device) or a camera based on a CMOS array, or having a pixel array sensor and an image processing unit. The laser tracker and the camera are here in particular mounted on top of one another such that their positions relative to one another are unchangeable. By way of example, the camera is arranged so as to be rotatable together with the laser tracker about the substantially perpendicular axis of the latter, but so as to be able to pivot up and down independently of the laser tracker and hence so as to be separate from the optics of the laser beam, in particular. In particular, the camera can have fish-eye optics and thus pivoting of the camera owing to a very large image capturing region of the camera can be avoided or at least be necessary in a limited fashion. In addition, the camera can be configured—for example in dependence on the respective use—to be pivotable about only one axis. In alternative embodiments, the camera may be installed in an integrated design together with the laser optics in a common housing.

By capturing and evaluating an image—using image capture and image processing units—of what is known as an auxiliary measuring instrument with markings whose relative positions with respect one another are known, it is possible to deduce an alignment of the instrument and of an object (for example a probe) arranged on the auxiliary measuring instrument in space. Together with the determined spatial position of the target point, it is furthermore possible to precisely determine the position and alignment of the object in space absolutely and/or relative to the laser tracker.

Such auxiliary measuring instruments can be embodied by what are known as contact sensing tools that are positioned with their contact point on a point of the target object. The contact sensing tool has markings, e.g. light dots, and a reflector, which represents a target point on the contact sensing tool and can be targeted using the laser beam from the tracker, with the positions of the markings and of the reflector relative to the contact point of the contact sensing tool being precisely known. In a manner known to a person skilled in the art, the auxiliary measuring instrument may also be a scanner, for example handheld, equipped for distance measurement for contactless surface surveying operations, with the direction and position of the scanner measurement beam used for the distance measurement relative to the light dots and reflectors that are arranged on the scanner being exactly known. Such a scanner is described in EP 0 553 266, for example.

Furthermore, in modern tracker systems—increasingly as standard—a sensor (PSD) is used to ascertain a deviation in the received measurement beam from a zero position. In this connection, a PSD is intended to be understood to mean an area sensor that operates locally in the analog domain and that can be used to determine a focus for a light distribution on the sensor area. In this case, the output signal from the sensor is produced by means of one or more photosensitive areas and is dependent on the respective position of the light focus. Downstream or integrated electronics can be used to evaluate the output signal and to ascertain the focus. In this case, the position of the focus of the impinging light dot can be ascertained very quickly (microsecond range) and with nanometer resolution.

This PSD can be used to determine a deviation in the impingement point of the captured beam from a servo control zero point, and the deviation can be taken as a basis for readjusting the laser beam to the target. For this purpose and in order to achieve a high level of precision, the field of view of this PSD is chosen to be comparatively small, i.e. to correspond to the beam diameter of the measurement laser beam. Capturing using the PSD takes place coaxially with respect to the measurement axis, as a result of which the capturing direction of the PSD corresponds to the measurement direction.

For distance measurement, laser trackers in the prior art have at least one distance measuring device, said distance measuring device possibly being in the form of an interferometer, for example. Since such distance measurement units can measure only relative distance changes, what are known as absolute distance meters are installed in today's laser trackers in addition to interferometers. By way of example, such a combination of measuring means for distance determination is known by means of the product AT901 from Leica Geosystems AG.

The interferometers used for the distance measurement in this connection can—on account of the large coherence length and the measurement range permitted thereby—have HeNe gas lasers or the abovementioned laser diodes as light sources, which laser diodes have stated advantages in terms of power consumption and space requirement. A combination of an absolute distance meter and an interferometer for determining distance with an HeNe laser is known from WO 2007/079600 A1, for example. Use of a laser diode as an interferometer laser light source is described, for example, in European patent application no. 11187614.0.

For a reliable distance measurement or a measurement of the distance change during use of the laser diode that is desired with respect to the above-mentioned advantages, here the wavelength of the measurement radiation used must be kept stable and be known precisely (in particular to within a few picometers). Reproducing such a determined and thus known wavelength using defined driving of the diode can in this context not take place with absolute reliability.

SUMMARY

Some embodiments of the present invention provide an improved laser tracker with an interferometer and a corresponding method, wherein means for generating laser radiation for the interferometer are configured to be compact in their entirety and an emission wavelength of the emitted laser radiation can be determined using apparatus in a reliable and unambiguous manner.

Some embodiments of the invention are the provisions of an improved laser tracker with means for stabilizing the emission wavelength and a tunable laser diode, wherein a current emission wavelength of the laser diode is determinable unambiguously.

Some embodiments object of the present invention are the provisions of an improved laser tracker, wherein the radiation emitted by a laser diode for an interferometer of the tracker is tunable with respect to the wavelength and the wavelength is precisely determinable.

Further, alternative aspects relating to the determination of a wavelength of a diode provided for interferometry in a measurement appliance, for example laser trackers, are described in European patent application number EP 12166955.0.

The invention relates to a laser tracker for continuously tracking a reflecting target and for determining a distance to the target. The laser tracker here has a base defining a vertical axis and a beam guiding unit for emitting measurement radiation and for receiving at least part of the measurement radiation reflected at the target, wherein the beam guiding unit can be pivoted in a motor-driven manner relative to the base about the vertical axis and an inclination axis which is substantially orthogonal to the vertical axis. Additionally, an interferometer for determining a change in the distance to the target using interferometry having a tunable laser diode configured as the interferometer laser beam source for generating the measurement radiation for the interferometer in such a way that the measurement radiation is coherent and longitudinally single-mode, an absolute distance measurement unit for determining a measurement distance value for a distance to the target, and angular measurement functionality for determining an orientation of the beam guiding unit relative to the base are provided.

According to the invention, a control and evaluation unit which is additionally provided is configured such that, during execution of a calibration mode, an interferometer wavelength of the measurement radiation is determined by carrying out defined sample measurements while varying the distance to the target, wherein the sample measurements take place for at least two different distances to the target, the measurement radiation is continuously aligned with respect to the target and an interferometer output variable is determined with the interferometer for each of the at least two different distances to the target while keeping the interferometer wavelength stable. Here, at least two measurement distance values for the at least two different distances to the target are provided in each case by determining a distance using the absolute distance measurement unit. The interferometer wavelength of the measurement radiation is determined at least on the basis of the at least two measurement distance values and the respectively determined interferometer output variables.

According to the invention, the beam source provided as the laser diode can also be used to realize a compact interferometer for a laser tracker, wherein the light source (laser diode having a large coherence length) is not additionally stabilized with respect to a gas cell but is kept stable by stable (low-noise) and precise driving of the diode. To determine the wavelength of the light source, the absolute distance meter that is present in a laser tracker in addition to the interferometer is used, in particular with active contribution by a user.

For simultaneous measurements of interferometer and absolute distance meter, a retroreflector is displaced in a tracked manner (that is to say the interferometer beam is continuously aligned with respect to the target), wherein, on the basis of measured distance differences of the two distance meters here, and in particular on the basis of the two approximate wavelengths and with knowledge of the atmospheric data pressure, humidity and temperature, the wavelength of the interferometer radiation which is stabilized merely via the operating parameters of the laser diode can be determined to within a few picometers (pm).

The wavelength thus determined is used for further interferometric measurements of the laser tracker. In addition, with further continuous, analog measurements of absolute distance meter (ADM) and interferometer (IFM) in normal measurement operation of the laser tracker, the interferometer wavelength can continue to be determined and possibly continuously updated. As a result, continuous calibration of the tracker can be carried out (self-calibration).

In addition, the use of an interferometer with a laser diode having a large coherence length, which is not additionally stabilized in relation to an absorption line, as the light source (according to the invention) also allows AIFM measurement (=combined measurements with ADM and IFM) on moving targets. The AIFM (=ADM+IFM) permits measurements on moving targets ("lock on-the-fly") with the knowledge and consideration of the relative distance changes during an ADM measurement, which changes are already measured by the interferometer without known absolute distance. Herefor, the wavelength stability provided by the highly stable driving of the laser diode according to the invention during an individual ADM measurement and only a very approximate knowledge of the IFM wavelength are sufficient. However, for carrying out measurements with high measurement rates corresponding to the typical use of laser trackers, the wavelength must be known precisely. Herefor, the calibration according to the invention is carried out.

Laser diodes in the context of the present invention are understood to be at least
distributed feedback laser (DFB) (with a periodically structured active medium, for example a grating),
distributed Bragg reflector laser (DBR) (with an optical grating outside the active medium but arranged on a common chip),
fiber Bragg grating laser (FBG) (substantially in accordance with a DFB laser, but with a grating in an external fiber),
external cavity diode laser (ECDL) (stabilization of the laser diode using an external highly stable cavity, for example with a holographic grating),
diode pumped solid state lasers (DPSS),
discrete mode lasers (DMD),
microchip lasers and/or
diode lasers.

However, alternative laser diode embodiments are not explicitly ruled out. Here, the diodes can be configured such that the emitted laser beam is generated with a coherence length in the order of magnitude of several 10 m (or a linewidth <1 MHz). In this connection, a wavelength-selective component, in particular an optical grating, can be provided for generating the measurement radiation.

In particular, the interferometer wavelength of the measurement radiation can be variable according to the invention by varying at least one operating parameter, and the control and evaluation unit can be configured such that the at least one operating parameter for the laser diode is adjustable precisely such that, due to the precise adjustment of the at least one operating parameter, the interferometer wavelength is settable such that it is approximately known.

With such exact and reliable driving of the diode, the interferometer wavelength cannot only be adjusted so precisely—e.g. by setting a diode current and a diode temperature—that the wavelength is approximately known, but said wavelength can be kept stable too. The approximate knowledge of the wavelength can additionally be used for the (precise) calculation or determination of the interferometer wavelength.

Thus, according to the invention, when the calibration mode is carried out, the interferometer wavelength of the measurement radiation can be additionally determined in dependence on the approximately known interferometer wavelength.

In one specific embodiment, the control and evaluation unit is configured according to the invention such that when starting the operation of the laser tracker, the at least one operating parameter for the laser diode is set such that a previous operating state for the laser diode is substantially reproduced, in particular a last previous operating state is substantially reproduced.

The starting method for a laser tracker according to the invention is thus designed in one corresponding embodiment such that initially the operating parameters (for the diode) stored when the system was last shut down are restored, and as a result substantially the wavelength of the preceding operating cycle is generated. Finally, the retroreflector can be displaced in a tracked manner, and the wavelength for the interferometer can be determined from the measured distance differences of the two distance meters (and the two rough wavelengths and with the knowledge of the atmospheric data pressure, humidity and temperature).

In this context, it is also possible to intercept a change in the adjustment parameters of the diode caused by ageing by storing in each case the last values.

With respect to the type of the operating parameters, a variable temperature of the laser diode can, according to the invention, constitute the at least one operating parameter and/or a variable electric current across the laser diode can constitute the at least one operating parameter. Therefore the interferometer wavelength of the diode can be varied by varying current and/or temperature of the diode.

A further aspect of the invention relates to the embodiment of the control and evaluation unit. The latter can be configured according to the invention such that, when a measurement mode is being carried out, the interferometer wavelength is regulated using the at least one operating parameter such that the interferometer wavelength remains stable.

In this case, under the control by the control and evaluation unit, the calibration mode can be carried out continuously while the measurement mode is being carried out, in particular wherein the interferometer wavelength of the measurement radiation determined during the calibration mode is stored for carrying out the measurement mode.

Therefore, it is possible, for example using further ADM measurements, to continuously monitor, determine and update the interferometer wavelength.

With respect to the embodiment of the laser diode according to the invention, the laser diode can be configured such that the interferometer wavelength can be generated with a coherence length of at least 10 m.

Furthermore, according to a specific embodiment of the invention, an interferometer reception unit of the interferometer for receiving the measurement radiation and a receiving unit of the absolute distance measurement unit differ, i.e. the absolute distance measurement unit has a receiving unit which is structurally separate or should be considered to be structurally separate from the receiver unit of the interferometer. Specifically, the interferometer and the absolute distance measurement unit can here share a beam source.

A further aspect of the invention relates to a laser tracker according to the invention having an absorption medium. In this connection, the laser tracker has an absorption medium defining a multiplicity of known absorption lines within a wavelength range, a memory having a stored line atlas for the absorption medium, which line atlas specifies, within the wavelength range for respective absorption wavelengths, in each case one absorption strength, and a detector for determining the absorption strength. Such a configuration of the tracker is provided for stabilizing the interferometer wavelength in dependence on an in each case currently determined absorption strength.

While the calibration mode is carried out, an orientation in the line atlas can be ascertained in particular according to the invention on the basis of the provided measurement distance values, the interferometer output variables, the multiplicity of known absorption lines and the determined absorption strength, in particular wherein the interferometer wavelength is determined in dependence on the ascertained orientation.

According to the invention, the laser tracker can furthermore have an absorption cell having an absorption medium, in particular wherein iodine gas forms the absorption medium and the interferometer wavelength is between 500 nm and 650 nm, in particular between 630 nm and 635 nm.

The invention also relates to a calibration method for and with a laser tracker comprising an interferometer for determining a change in the distance to a target using interferometry having a tunable laser diode configured as the interferometer laser beam source for generating a measurement radiation for the interferometer in such a way that the measurement radiation is coherent and longitudinally single-mode, and with an absolute distance measurement unit for determining a measurement distance value for a distance to the target.

During the calibration method, an interferometer wavelength of the measurement radiation is determined by carrying out defined sample measurements while varying the distance to the target, wherein the sample measurements are carried out for at least two different distances to the target and the measurement radiation is continuously aligned with respect to the target and an interferometer output variable is determined with the interferometer for each of the at least two different distances to the target while keeping the interferometer wavelength stable. Additionally, at least two measurement distance values for the at least two different distances to the target are provided in each case by determining a distance using the absolute distance measurement unit. The interferometer wavelength of the measurement radiation is determined at least on the basis of the at least two measurement distance values and the respectively determined interferometer output variables.

According to a more specific embodiment, an orientation in a line atlas, which specifies in each case one absorption strength for respective absorption wavelengths, is ascertained in dependence on the provided measurement distance values, the interferometer output variables and a measured absorption strength, in particular wherein the interferometer wavelength is determined in dependence on the ascertained orientation.

In the context of the invention, the distance to the target can furthermore be varied by a user manually moving the target.

The invention also relates to a computer program product, stored on a machine-readable carrier, for controlling the carrying-out of sample measurements and for executing the determination of the interferometer wavelength of a calibration method according to the invention, in particular if the computer program product is executed on a control and evaluation unit of a laser tracker according to the invention.

BRIEF DESCRIPTION OF THE DRAWINGS

The method according to the invention and the apparatus according to the invention will be described below in more detail in purely exemplary form with reference to concrete exemplary embodiments illustrated schematically in the drawings, wherein further advantages of the invention will also be discussed. Specifically.

DETAILED DESCRIPTION

Figure 1:
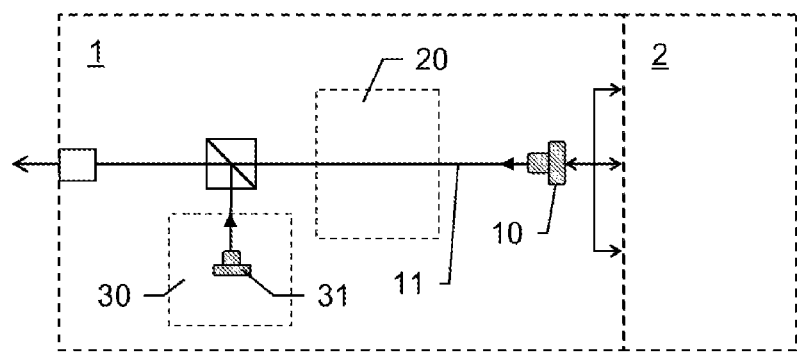
FIG. 1 shows an embodiment of an optical construction of a laser tracker according to the invention having a laser diode configured as an interferometer beam source.

FIG. 1 shows an embodiment of an optical construction 1 of a laser tracker according to the invention having a laser diode 10, which is configured as an interferometer beam source, an interferometer unit 20, and an absolute distance measurement unit 30, having a further beam source 31, in particular configured as a laser diode or SLED. Using the laser diode, a measurement radiation 11 for the interferometer 20 is provided for determining changes in the distance to an object, wherein the absolute distance measurement unit 30 can be used to determine absolute distances to objects. In addition, a control and evaluation unit 2 for controlling the laser diode 10 by way of at least temperature and/or current regulation. Furthermore, measurement data (e.g. determined distances or interferometer output variables) produced by the interferometer unit 20 and the absolute distance measurement unit 30 can be processed therewith.

The interferometer wavelength or emission wavelength of the laser diode 10 is tuned here by regulating the electric current across the diode 10 and/or the temperature of the diode 10 using the control and evaluation unit 2. Due to the precise adjustment of the operating parameters provided for driving the laser diode 10, the wavelength of the radiation emitted at the diode 10 can be set such that the interferometer wavelength used for interferometric measurements is at least approximately known.

In general, the laser diode 10 supplies laser light with a mode hop-free tunable wavelength range. The generated laser light additionally has a large coherence length, in particular at least 10 m, preferably at least 50 m.

To identify the interferometer wavelength, the control and evaluation unit 2 provides a calibration functionality according to the invention. For calibration taking place when this functionality is executed, first, defined sample measurements are carried out. The sample measurements are carried out with variation of a distance to a target or object, wherein in each case one interferometer output variable is determined as the measurement result using the interferometer unit 20 for each sample measurement and furthermore the distance to the object is measured using the absolute distance measurement unit 30.

By taking into account respective interferometer output variables and associated distances overall, the interferometer wavelength can be derived from at least two such sample measurements. To this end, the difference in distance to the target, determined using the absolute distance measurement unit 30, can be compared to the interferometer signals determined for this distance change. Said interferometer signals are generated by way of example by continuous detection of alternately constructive and destructive interference, wherein a number of transitions between constructive and destructive interference (interferometer counts) are counted and tracked, and a distance change can be derived therefrom.

During the determination of the interferometer wavelength, additionally the wavelength for the interferometer, which is approximately known due to the exact fine-driving of the laser diode 10, and a second wavelength for a second laser radiation generated for the absolute distance measurement can also be taken into account. In this connection, climate information, such as for example air pressure and/or air temperature, can additionally be integrated into the determination of the interferometer wavelength and taken into account here.

The measurement radiation 11 for the determination of the interferometer wavelength is furthermore continuously directed on the target during the variation of the distance to the target. Reception of continuous interferometer signals and the derivation therefrom of an interferometric value for the distance change are made possible thereby. Together with a second (reference) value for the change in the distance to the target, for example from the measurements of the absolute distance measurement unit 30 for the respective different distances, it is possible using calculation, in particular curve fitting (for example "best fit"), to determine the interferometer wavelength.

Figure 2:
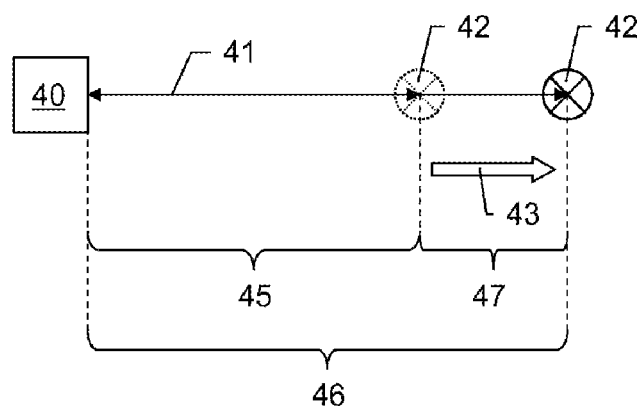
FIG. 2 shows a calibration according to the invention using a laser tracker.

FIG. 2 schematically illustrates a calibration according to the invention with a laser tracker 40. The laser tracker 40 can in this case for example have an optical construction 1 according to the invention with control and evaluation unit 2, wherein the control and evaluation unit 2 provides a calibration mode, according to FIG. 1.

Additionally illustrated is a target 42, for example a retroreflector, which is displaced from a first position into a second position. This change in position is indicated by the arrow 43. A measurement laser beam 41 of the laser tracker 40 is directed on the target 42 and is retroreflected therefrom—at least partially—and received at the tracker 40. Said beam 41 is generated as a mode hop-free laser beam with a large coherence length, in particular of at least 10 m, preferably of at least 50 m, by a correspondingly specified laser diode. A first distance 45 of the target 42 from the laser tracker 40 is defined by the first positioning of the target 42. A second distance 46 between the laser tracker 40 and the target 42 is additionally defined by the indicated displacement 43 of the target 42 to the second position. This produces a distance difference 47 between the first and second target positioning.

For the execution of the calibration, the measurement laser beam 41 of the tracker 40 remains continuously directed on the target 42 during the displacement operation, so that the change in the distance produced by the displacement 43 can be tracked by the tracker 40. To this end, signals, which are generated by an interferometer in the tracker 40, are continuously read during the change in position of the target 42 which is taking place and a value representative of the distance difference 47 is ascertained with a high degree of precision due to these interferometric measurements. To this end, the interferometer uses the measurement laser radiation 41. By way of example, a number of alternately constructive and destructive interference can be captured, wherein the number can correspond to respective transitions between constructive and destructive interference (what is referred to as interferometer counts).

In addition, for the calibration, the two distances 45, 46 to the target 42 are determined using the absolute distance measurement unit. The distance values ascertained thereby are, according to the invention, assigned to the respective values produced for these distances 45, 46 with the interferometer. As a result, respective value pairs can be formed for the at least two distances 45, 46. In dependence on these value pairs, the interferometer wavelength for the measurement radiation 41 can be determined precisely, in particular to within a few picometers.

Specifically, the distance value determined with the absolute distance meter can be used for each position of the target 42 and be linked to the associated interferometer value. A difference 47 between the distances 45, 46 can additionally be calculated and, in parallel therewith, a difference for the interferometer values can be derived, wherein said interferometer difference value can for example in turn be embodied by a number of interferometer counts. Then, the wavelength can be deduced from these differences (distance and interferometer output variable).

In particular, for this calculation, additionally the approximately known wavelength of the absolute distance measurement unit and of the measurement radiation can be taken into account and thus the accuracy of the calculation can be increased or an error for the calculation can be reduced. Additionally, current meteorological data can also be taken into account in the calculation.

Based on the interferometer thus calibrated, highly precise distance measurements and measurements of distance changes can be carried out as a result. In particular, in each case information that can be provided both by the absolute distance measurement unit and by the interferometer is used herefor.

Figure 3:
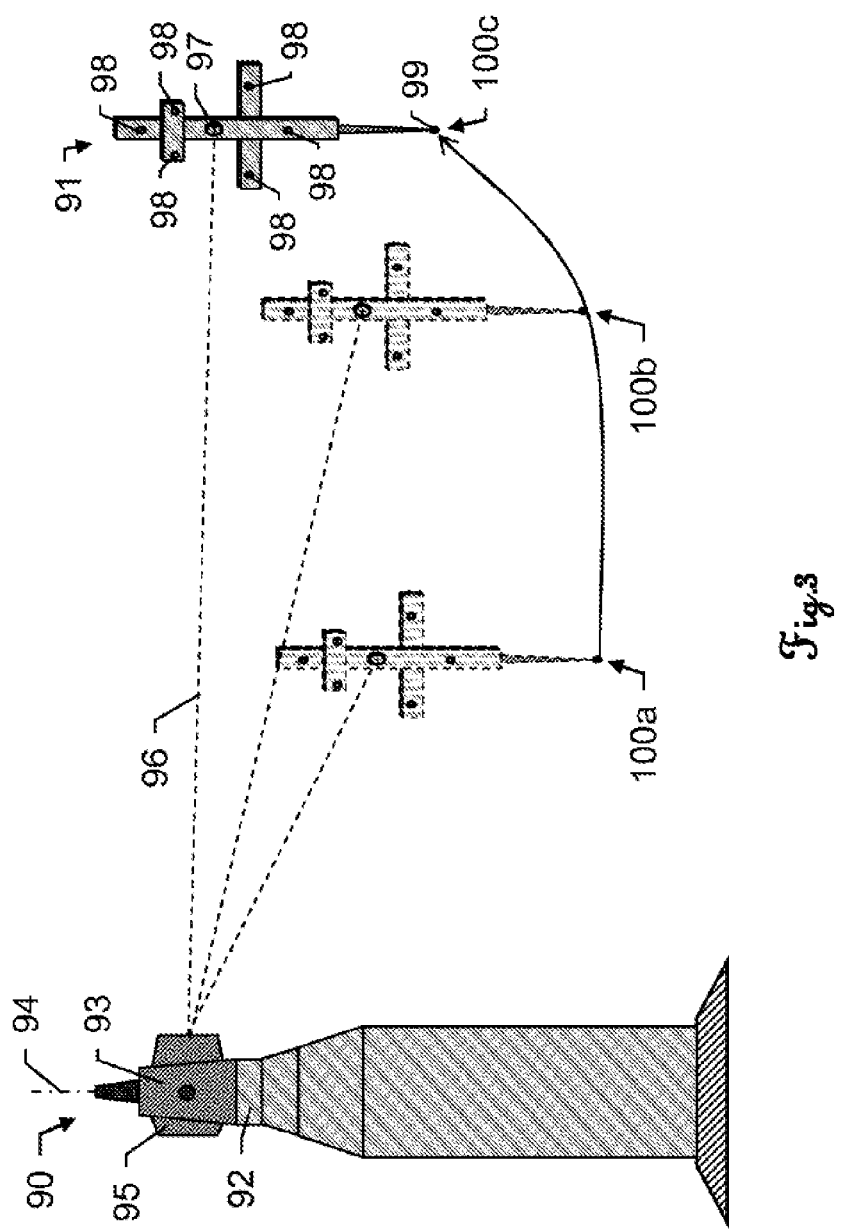
FIG. 3 shows an embodiment for a laser tracker according to the invention and a calibration process according to the invention using the tracker.

FIG. 3 shows an embodiment for a laser tracker 90 according to the invention, comprising an auxiliary measuring instrument 91 with reflector 97. The laser tracker 90 comprises a base 92 and a support 93, wherein the support 93 is arranged such that it is pivotable or rotatable relative to the base 92 about a pivot axis 94 (vertical axis) defined by the base 92. Moreover, a targeting unit 95 is arranged on the support 93 in such a way that the targeting unit 95 can be pivoted relative to the support 93 about an inclination axis (transit axis). As a result of an alignment possibility provided of the targeting unit 95 about two axes of this nature, a laser beam 96 (measurement beam) emitted by this unit 95 can be flexibly aligned and therefore targets can be targeted. Here, the pivot axis 94 and the inclination axis are arranged substantially orthogonal to one another, i.e. small deviations from an exact axis orthogonality can be predetermined and stored in the system, for example for compensating measurement errors resulting therefrom.

In the shown arrangement, the laser beam 96 is directed on the reflector 97 and is retroreflected at the latter back to the laser tracker 90. It is possible to determine a distance to the reflector 97 by means of this measurement laser beam 96, in particular by means of time-of-flight measurement, by means of the phase measurement principle or by means of the Fizeau principle. To this end, the laser tracker 90 comprises a distance measurement unit (absolute distance measurement unit), for determining this distance between the tracker 90 and the reflector 97, and angle measurement units, which make it possible to determine a position of the targeting unit 95, by means of which the laser beam 96 can be aligned and guided in a defined manner, and hence make it possible to determine a propagation direction of the laser beam 96. Moreover, the tracker 90 comprises an interferometer unit for determining changes in the distance to a target by means of interferometry.

Moreover, the laser tracker 90, in particular the targeting unit 95, comprises an image capture unit for the purposes of determining the position of a sensor exposure on a sensor or a CMOS in a captured image or is, in particular, embodied as a CCD or pixel sensor array camera. Such sensors permit position-sensitive detection of captured exposure on the detector.

Furthermore, the auxiliary measuring instrument 91 comprises a tactile sensor, the contact point 99 of which can be brought into contact with a target object to be measured. While this contact exists between the contact sensing tool 91 and the target object, it is possible to exactly determine a position of the contact point 99 in space and hence the coordinates of a point on the target object. This determination takes place using a defined relative positioning of the contact point 99 in relation to the reflector 97 and in relation to markings 98 arranged on the auxiliary measuring instrument 91, which markings can be embodied as light-emitting diodes, for example. Alternatively, the markings 98 can also be embodied in such a way that they reflect (auxiliary point markings 98 embodied as retroreflectors) the incident radiation, in particular exhibit a specific illumination characteristic, when they are illuminated, e.g. with radiation having a defined wavelength, or that they have a defined pattern or color coding. An orientation of the contact sensing tool 91 can thus be determined from the position or distribution of the markings 98 in an image captured with the sensor of the image capture unit.

In an alternative embodiment (not shown here), a laser tracker according to the invention has a beam guidance unit, separated from the image capture unit, for emitting the laser beam, which can likewise be directed onto the reflector 97. Here, both the laser beam and the image capture unit can in each case be pivoted about two axes in a motor-driven manner and can, as a result thereof, be aligned in such a way that the target 97 targeted by the laser beam and the markings 98 of the auxiliary measuring instrument 91 can be captured by means of the image capture unit.

In order to align the laser beam 96 with the reflector 97, illumination means for illuminating the reflector 97 with radiation having a specific wavelength, in particular in the infrared wavelength range, are provided on the laser tracker 90 according to the invention and, additionally, at least one, preferably two cameras with position-sensitive detectors are arranged on each tracker 90. The illumination radiation, which is reflected at the reflector 97 and radiated back to the laser tracker 90, can be detected by means of the cameras, and a position of the reflector 97 on the respective detector can be imaged with each one of the position-sensitive detectors. It is thus possible to determine two imaged positions of the reflector by means of the laser tracker 90 and to find the target (reflector 97) on the basis of these imaged target positions—e.g. according to well-known principles of photogrammetry—and to align the targeting unit 95 in such a way that the target is targeted by the measurement beam 96.

Moreover, an approximate position of the reflector can be determined on the basis of in each case two images captured using the laser tracker 90. This position can be determined according to general geometric or trigonometric principles, for example according to geometric construction principles of triangles or by means of the sine and/or cosine laws. Moreover, in order to determine the position approximately, use can be made of well-known processes in photogrammetry (stereophotogrammetry). To this end, the relative positions and, in particular, alignments of the cameras with respect to one another on the tracker 90 are also known.

In this context, the illumination means and the cameras can be arranged in respectively defined positions for example on the image capture unit, the beam guiding unit, the targeting unit 95, the support 93 or the base 92.

Using knowledge of the positioning of the cameras relative to an emission direction of the laser beam 96, the laser beam 96 can be aligned with respect to the ascertained approximate position of the reflector 97 and can be coupled thereto (lock-on). As a result, the beam 96 can be quickly aligned, despite a structurally caused offset between the laser emission direction and the capturing directions of the cameras, and a parallax given by the optical axes of the cameras and the laser beam 96 can be determined. In particular, the laser beam 96 can be aligned directly with the target 97, i.e. without an iterative intermediate step.

In particular, it is possible—as an alternative or in addition to determining the approximate position of the reflector 97—to determine an (approximate) distance to the reflector 97 from the target positions captured and imaged on the detectors (on the laser tracker 90). This determination can also be brought about by means of generally valid geometric principles, for example by means of the right triangle altitude theorem and/or by means of sine and/or cosine laws.

Moreover, an alignment according to the invention of the laser beam 96 can also find application in the case of laser trackers without image capture unit for determining the orientation (6-DoF camera) of an auxiliary measuring instrument 91 (3D laser tracker).

Furthermore, FIG. 3 shows a procedure for a calibration according to the invention. To this end, measurements to the auxiliary measuring instrument 91 are carried out with different positions 100a-c of the auxiliary measuring instrument 91. A distance to the tracker 90 is known for each position 100a-c by measurement with the absolute distance measurement unit, wherein the absolute distance measurement unit comprises a further laser beam source (in addition to the diode for generating the measurement radiation for the interferometer). The measurement radiation generated by the laser diode for the interferometer of the laser tracker 90 is kept stable according to the invention by very precise and robust drive electronics for the diode such that the wavelength of the measurement radiation is highly constant—at least for the calibration process. The wavelength predetermined thereby substantially depends in this case on the operating parameters of the laser diode (e.g. current and temperature) and on the drive electronics for the diode.

In one specific embodiment, the measurement radiation for the interferometer of the laser tracker 90, generated by the laser diode, can also be stabilized to an emission wavelength using a wavelength stabilization unit (absorption cell) and is therefore approximately known. While stabilization to a fixed wavelength is possible, this wavelength must be known in terms of magnitude for correct and reliable distance measurements (measurements of changes in the distance using the interferometer). The calibration according to the invention is carried out in order to determine this wavelength.

To this end, during the calibration according to the invention, an interferometer output variable is determined using the interferometer of the laser tracker 90 at at least two of the positions 100a-c, in particular continuously at a multiplicity of positions between position 100a and position 100c. Here, the reflector 97 is followed in a tracked manner, i.e. the measurement beam is continuously directed onto the reflector 97 during this measurement process. By way of example, the interferometer output variable may be a number of interferometer pulses (counts), which are given by alternating capturing of destructive and constructive interference and which can be counted, (e.g. homodyne interferometer) or by a phase difference between a reference signal and a measurement signal (e.g. heterodyne interferometer). Moreover, an absolute distance to the reflector 97 is measured or given in each case (using ADM). The interferometer output variable thus measured for each position and the respective distance are evaluated by algorithm, taking into account the respectively approximately known wavelengths (for the absolute distance meter and interferometer). As a result of this, the present wavelength for the measurement radiation of the laser diode can be estimated very precisely. In particular, atmospheric data, such as e.g. air pressure, humidity and surrounding temperature, are additionally taken into account for this estimate. An orientation in a line atlas, which indicates an absorption strength (for the absorption cell) for respective wavelengths, can also be determined on the basis of the estimate of the emission wavelength and with use of a line atlas for the absorption medium of the wavelength stabilization unit—according to the specific embodiment. As a result, an absorption line of the absorption medium used for stabilization can be identified and hence the emission wavelength can be determined.

The auxiliary measuring instrument 91 can generally be guided and its position displaced by a user, wherein the laser 96 remains directed continuously onto the reflector 97 (target). As a result, the various distances between tracker 90 and reflector 97 can be provided and interferometer information can be produced.

Figure 4:
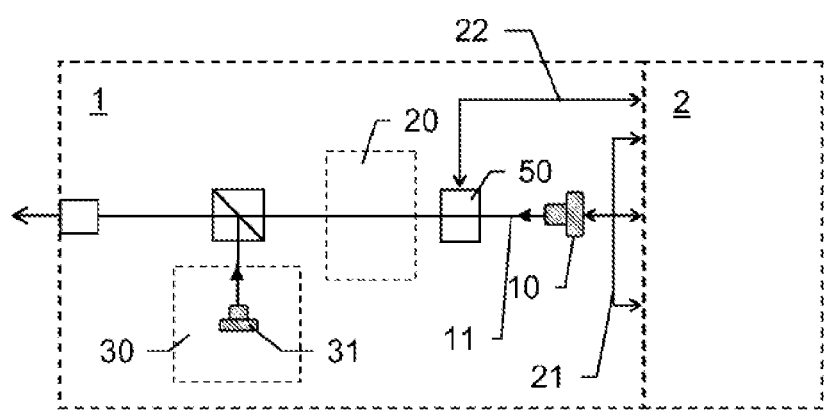
FIG. 4 shows a further embodiment of an optical construction of a laser tracker according to the invention and according to FIG. 1 additionally having an absorption cell.

FIG. 4 shows a further embodiment of an optical construction 1 of a laser tracker according to the invention according to FIG. 1 with additionally one absorption cell 50.

During a stabilization mode, the absorption cell 50 is used to realize a stabilization of the measurement radiation 11 to a wavelength standard, i.e., in this case to an absorption line (e.g. approximately 633 nm) which is defined (e.g. iodine, $I_2$) by an absorption medium of the absorption cell 50. In particular, different stabilization approaches can be used for the stabilization, such as e.g. synchronous detection (modulation of the optical frequency about a central absorption line), a "side-of-line" process or stabilization by means of the Zeeman effect at constant optical frequency (by magnetic modulation).

During the synchronous detection, a continuous change in the wavelength (and hence a change in a distance measured on the basis thereof) is generated, which primarily manifests itself as an increased distance noise, wherein the distance noise can, however, be largely eliminated by an increased measurement rate and subsequent integration or synchronized distance measurement.

The "side-of-line" process is based on a stabilization by means of absorption at an absorption value which substantially corresponds to the maximum gradient of a corresponding absorption line of an absorption cell 50 typically embodied as a gas cell (e.g. stabilization at approximately 40% absorption). Since the absorption of a line depends on the gas pressure of the absorption medium (e.g. iodine gas) and hence on the temperature of the absorption cell, the temperature of the absorption cell 50 must be kept very constant in this case.

For the stabilization, the operating parameters (for example current and/or temperature) for the laser diode 10 are regulated using the control and evaluation unit 2 such that the measurement radiation 11 is emitted at a substantially constant wavelength. To this end, an absorption level in the absorption cell 50 is continuously measured, wherein the measurement information generated in the process is processed using the control and evaluation unit 2 and corresponding control signals for the diode 10 are generated (indicated by arrows 21, 22).

For the absorption medium of the additional absorption cell 50, a line atlas (line spectrum) is also stored, which line atlas defines a respective absorption strength for the medium for respective wavelengths. In one specific embodiment, a current absorption strength can also be measured, in particular continuously, using an absorption detector, which can be assigned to the cell 50.

A currently measured absorption strength and the knowledge of the line spectrum can additionally be taken into account in the determination, according to the invention, of the interferometer wavelength of the measurement radiation 11 (according to FIG. 1). By way of the absorption cell 50, firstly an alternative or additional stabilization of the radiation 11 can take place and, secondly when taking into account the reference (line atlas), an increased accuracy of the wavelength determination can be achieved.

If in each case one interferometer output variable is determined for a plurality of different distances to the object, an orientation in the line atlas can additionally be determined while taking into account the respective distance to the object present during the sample measurement, the determined interferometer output variables and the reference (for example known absorption line spectrum for the absorption medium used), and the interferometer wavelength can be determined therefrom.

It is understood that these depicted figures only schematically depict possible exemplary embodiments. The various approaches can, according to the invention, likewise be combined with one another and with calibration and/or interferometry methods, with methods for determining the distance and with generic measuring apparatuses, in particular laser trackers, of the prior art. The aspects according to the invention can also find application in the technical field of geodetic surveying devices such as e.g. total stations and tachymeters.

What is claimed is:

1. A laser tracker for continuously tracking a reflecting target and for determining a distance to the target, the laser tracker comprising:
   a base defining a vertical axis;
   a beam guiding unit for emitting measurement radiation and for receiving at least part of the measurement radiation reflected at the target, wherein the beam guiding unit can be pivoted in a motor-driven manner relative to the base about the vertical axis and an inclination axis which is substantially orthogonal to the vertical axis;
   an interferometer for determining a change in the distance to the target using interferometry having a tunable laser diode configured as the interferometer laser beam source for generating the measurement radiation for the interferometer in such a way that the measurement radiation is coherent and longitudinally single-mode;
   an absolute distance measurement unit for determining a measurement distance value for a distance to the target; and
   an angular measurement functionality for determining an orientation of the beam guiding unit relative to the base;
   a control and evaluation unit configured such that, during execution of a calibration mode, an interferometer wavelength of the measurement radiation is determined by:
      carrying out defined sample measurements while varying the distance to the target, wherein
         the sample measurements take place for at least two different distances to the target,
         the measurement radiation is continuously aligned with respect to the target and an interferometer output variable is determined with the interferometer for each of the at least two different distances to the target while keeping the interferometer wavelength stable, and
         at least two measurement distance values for the at least two different distances to the target are provided in each case by determining a distance using the absolute distance measurement unit; and
      determining the interferometer wavelength of the measurement radiation at least on the basis of the at least two measurement distance values and the respectively determined interferometer output variables.

2. The laser tracker as claimed in claim 1, wherein the interferometer wavelength of the measurement radiation is variable by varying at least one operating parameter, and the control and evaluation unit is configured such that the at least one operating parameter for the laser diode is adjustable precisely such that, due to the precise adjustment of the at least one operating parameter, the interferometer wavelength is settable such that it is approximately known.

3. The laser tracker as claimed in claim 2, wherein when the calibration mode is carried out, the interferometer wavelength of the measurement radiation is additionally determined in dependence on the approximately known interferometer wavelength.

4. The laser tracker as claimed in claim 2, wherein the control and evaluation unit is configured such that when starting the operation of the laser tracker, the at least one operating parameter for the laser diode is set such that a previous operating state for the laser diode is substantially reproduced.

5. The laser tracker as claimed in claim 2, wherein the control and evaluation unit is configured such that when starting the operation of the laser tracker, the at least one operating parameter for the laser diode is set such that a last previous operating state is substantially reproduced.

6. The laser tracker as claimed in claim 2, wherein a variable temperature of the laser diode constitutes the at least one operating parameter and/or a variable electric current across the laser diode constitutes the at least one operating parameter.

7. The laser tracker as claimed in claim 2, wherein the control and evaluation unit is configured such that, when a measurement mode is being carried out, the interferometer wavelength is regulated using the at least one operating parameter such that the interferometer wavelength remains stable.

8. The laser tracker as claimed in claim 7, wherein under the control by the control and evaluation unit, the calibration mode is carried out continuously while the measurement mode is being carried out.

9. The laser tracker as claimed in claim 1, wherein the laser diode is configured such that the interferometer wavelength can be generated with a coherence length of at least 10 m, and/or an interferometer reception unit of the interferometer and a receiver unit of the absolute distance measurement unit differ.

10. The laser tracker as claimed in claim 1, further comprising:
    an absorption medium defining a multiplicity of known absorption lines within a wavelength range,
    a memory having a stored line atlas for the absorption medium, which line atlas specifies, within the wavelength range for respective absorption wavelengths, in each case one absorption strength, and
    a detector for determining the absorption strength for stabilizing the interferometer wavelength in dependence on an in each case currently determined absorption strength.

11. The laser tracker as claimed in claim 10, wherein while the calibration mode is carried out, an orientation in the line atlas is ascertained on the basis of the provided measurement distance values, the interferometer output variables, the multiplicity of known absorption lines and the determined absorption strength.

12. The laser tracker as claimed in claim 10, wherein the interferometer wavelength is determined in dependence on the ascertained orientation.

13. The laser tracker as claimed in claim 10, wherein the laser tracker has an absorption cell having an absorption medium, wherein iodine gas forms the absorption medium and the interferometer wavelength is between 500 nm and 650 nm.

14. The laser tracker as claimed in claim 10, wherein
the laser tracker has an absorption cell having an absorption medium, wherein iodine gas forms the absorption medium and the interferometer wavelength is between 630 nm and 635 nm.

15. The laser tracker as claimed in claim 1, wherein the interferometer wavelength of the measurement radiation determined during the calibration mode is stored for carrying out the measurement mode.

16. A calibration method comprising,
determining a change in the distance to a target using an interferometer having a tunable laser diode configured as the interferometer laser beam source for generating a measurement radiation for the interferometer in such a way that the measurement radiation is coherent and longitudinally single-mode;
determining a measurement distance value for a distance to the target;
carrying out defined sample measurements while varying the distance to the target, wherein
the sample measurements are carried out for at least two different distances to the target,
the measurement radiation is continuously aligned with respect to the target and an interferometer output variable is determined with the interferometer for each of the at least two different distances to the target while keeping the interferometer wavelength stable, and
at least two measurement distance values for the at least two different distances to the target are provided in each case by determining a distance using the absolute distance measurement unit and
determining the interferometer wavelength of the measurement radiation at least on the basis of the at least two measurement distance values and the respectively determined interferometer output variables.

17. The calibration method as claimed in claim 16, wherein
an orientation in a line atlas, which specifies in each case one absorption strength for respective absorption wavelengths, is ascertained in dependence on the provided measurement distance values, the interferometer output variables and a measured absorption strength, wherein the interferometer wavelength is determined in dependence on the ascertained orientation.

18. The calibration method as claimed in claim 16, wherein
the distance to the target is varied by a user manually moving the target.

19. A non-transitory computer program product, stored on a machine-readable carrier, comprising instructions for
controlling the carrying-out of sample measurements;
determining a change in the distance to a target using an interferometer having a tunable laser diode configured as the interferometer laser beam source for generating a measurement radiation for the interferometer in such a way that the measurement radiation is coherent and longitudinally single-mode;
determining a measurement distance value for a distance to the target;
carrying out defined sample measurements while varying the distance to the target, wherein
the sample measurements are carried out for at least two different distances to the target,
the measurement radiation is continuously aligned with respect to the target and an interferometer output variable is determined with the interferometer for each of the at least two different distances to the target while keeping the interferometer wavelength stable, and
at least two measurement distance values for the at least two different distances to the target are provided in each case by determining a distance using the absolute distance measurement unit and
determining the interferometer wavelength of the measurement radiation at least on the basis of the at least two measurement distance values and the respectively determined interferometer output variables.

20. The laser tracker as claimed in claim 1, wherein
the laser diode is configured such that the interferometer wavelength can be generated with a coherence length of at least 50 m, and/or
an interferometer reception unit of the interferometer and a receiver unit of the absolute distance measurement unit differ.

* * * * *